United States Patent Office 3,404,086
Patented Oct. 1, 1968

3,404,086
HYDROTHERMALLY STABLE CATALYSTS OF HIGH ACTIVITY AND METHODS FOR THEIR PREPARATION
Charles J. Plank, Woodbury, and Edward J. Rosinski, Deptford, N.J., assignors to Mobil Oil Corporation, a corporation of New York
No Drawing. Filed Mar. 30, 1966, Ser. No. 538,608
10 Claims. (Cl. 208—120)

ABSTRACT OF THE DISCLOSURE

The invention is directed to a novel hydrothermally stable hydrogen form crystalline aluminosilicate catalyst of high hydrocarbon conversion activity produced by a process which comprises calcining an ammonium crystalline aluminosilicate, characterized by a silica to alumina mol ratio of at least 3, in an atmosphere consisting essentially of ammonia gas.

---

This invention relates to hydrothermally stable catalysts of high activity and methods for their preparation and, more particularly, to hydrothermally stable crystalline aluminosilicate catalysts having high hydrocarbon conversion activity to methods for preparing such catalysts, and the conversion of hydrocarbons in the presence of such catalysts.

Zeolitic materials, both natural and synthetic, have been demonstrated in the past to have catalytic capabilities for the conversion of organic materials. Such zeolitic materials are ordered, porous crystalline aluminosilicates having a definite crystalline structure within which there are a large number of small cavities which are interconnected by a number of still smaller channels.

These materials include a wide variety of positive ion-containing crystalline aluminosilicates, both natural and synthetic, which can be described as a rigid three dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This equilibrium can be expressed by formula wherein the ratio of Al to the number of the various cations, such as Ca/2, Sr/2, Na, K or Li, is equal to unity. One cation may be exchanged either in entirety or partially by another cation utilizing conventional ion exchange techniques. By means of such cation exchange, it is possible to vary the size of the pores in a given aluminosilicate by suitable selection of the particular cation. The spaces between the tetrahedra are occupied by molecules of water prior to dehydration. The zeolite is dehydrated to activate it for use as a catalyst.

Synthetic crystalline aluminosilicates are ordinarily prepared initially in the sodium forms of the crystal, the process of preparation involving heating, in aqueous solution, an appropriate mixture of oxides, or of materials whose chemical composition can be completely represented as a mixture of oxides $Na_2O$, $Al_2O_3$, $SiO_2$ and $H_2O$, at a temperature of approximately 100° C. for periods of 15 minutes to 90 hours or more. The product which crystallizes within this hot mixture is separated therefrom and water washed until the water in equilibrium with the aluminosilicate has a pH in the range of 9 to 12. The aluminosilicate may then be activated by heating until dehydration is attained.

A description of such aluminosilicates, methods for their preparation and examples of their uses are found in U.S. Patents 2,882,243, 2,971,824, 3,033,778 and 3,130,007.

A particularly catalytically active form of crystalline aluminosilicates has been the acid form. It has been prepared in the past by exchanging metal aluminosilicates with acid solutions, however, this treatment has proven too severe for most of the aluminosilicates, especially those with low silica to alumina mol ratios, resulting in their destruction. A more common technique for converting a crystalline aluminosilicate to its acid form involves its initial conversion to the ammonium form through the use of base exchange, and calcining the resultant ammonium aluminosilicate to cause thermal degradation of the ammonium ions. Such degradation results in the release of ammonia gas and the formation of the desired protonic or hydrogen cationic sites.

Calcination of ammonium crystalline aluminosilicates has previously been characterized by an inexactness in the definition of calcining conditions. In carrying out such calcination reactions the prior art has specified conditions such as time, temperature, and the nature of the calcination atmosphere, but no consideration has been given to the possible influence of ammonolysis during calcination. This has effectively prevented prior art investigators from appreciating the extreme importance of calcination conditions to the activity of the subsequent catalysts produced therefrom and has resulted in the formation of catalysts, such as the acid form aluminosilicate, which are hydrothermally unstable.

It is, accordingly, a primary object of the present invention to provide new hydrothermally stable crystalline aluminosilicate catalysts of high hydrocarbon conversion activity, and a process for producing them.

It is another important object of the present invention to provide a novel technique for preparing hydrothermally stable crystalline aluminosilicate catalysts of high activity wherein the aluminosilicate is rendered hydrothermally stable during, rather than after, calcination.

It is a further object of the present invention to provide a novel technique for preparing hydrothermally stable crystalline aluminosilicate catalysts of high activity involving selective removal of aluminum atoms from the framework of the aluminosilicate producing a crystal lattice deficient in aluminum atoms prior to completion of calcination.

In accordance with the present invention, there have now been discovered new hydrothermally stable hydrogen Y crystalline aluminosilicate catalysts of high hydrocarbon conversion activity produced by a process which comprises calcining ammonium Y aluminosilicates in an atmosphere consisting essentially of ammonia gas. Not only do the resultant catalysts of this invention show high hydrocarbon conversion activity, but they also show remarkably strong resistance to steam damage, an important attribute in those commercial cracking units employing steam during their operation.

Thermal degradation of the ammonium Y crystalline aluminosilicates in carrying out the process of the present invention is conducted at temperatures of about 500° C. or over, preferably about 700° C.; temperatures substantially below this level, i.e., about 450° C., yield hydrothermally unstable products.

Ammonium Y crystalline aluminosilicates calcined in the presence of ammonia gas in the manner of the invention for periods ranging from about 1 hour to about 24 hours have all produced hydrothermally stable products. Products obtained from the 1 hour calcination period appear to be hydrogen zeolites wherein essentially all of the aluminum apparently remains in tetrahedrally coordinated positions in the lattice framework. The 24 hour calcination product, however, yielding what appears to be an hydrogen aluminum Y aluminosilicate, seems to have undergone alteration of a significant portion of the aluminum in the lattice framework. About 30% of the aluminum has been removed from the lattice framework and occupies cation sites having an average positive valency of about 1.5. About half of the remaining aluminum in tetrahedral sites appears to be associated with hydrogen (not free cationic protons). For intermediate calcination times, the nature of the products falls in between the extremes described above, approaching the hydrogen aluminum Y material, above-mentioned as calcination time is increased.

Hydrothermal stability as referred to above and henceforth is determined first by sorbing water on the catalyst at room temperature and then subjecting the catalyst to an elevated temperature by placing it into a muffle furnace operating at about 300° C. to 900° C. Subsequent loss of crystallinity as detected by X-ray diffraction indicates hydrothermal instability.

Although the invention has been defined above, in terms of zeolite-Y for the sake of convenience, the zeolites which may be treated in accordance with the present invention comprise ammonium crystalline aluminosilicates having a mol ratio of silica to alumina of at least 3. This, of course, includes the crystalline aluminosilicates having a faujasite crystal structure and commonly designated as zeolite Y. It is also contemplated, in the practice of this invention, to employ ammonium crystalline aluminosilicates, such as ammonium Y, wherein up to about 50% of the ammonium ions have been replaced with rare earth metal cations, or the like.

It is believed that the phenomenon involved in the production of catalysts having both excellent hydrothermal stability and high hydrocarbon conversion activity may be explained in connection with the following suggested mechanism, which is not to be deemed as limitative in nature.

Recent studies on the formation of hydrogen zeolite Y show that rapid removal of ammonia and adsorbed water during the thermal decomposition of the ammonium zeolite Y leads to a substance whose chemistry may be represented by the structures:

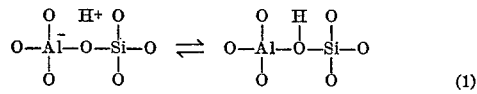

(1)

Studies have shown that this substance (H/Al atom ratio ≅0.9) is hydrothermally unstable. Although no significant loss in crystallinity of the hydrogen zeolite occurs on adsorption of water at room temperature, subjecting the water-loaded zeolite to temperatures of 300° or higher results in complete loss of crystallinity as shown by X-ray diffraction powder photographs and sorptive capacity measurements.

On the other hand, slow removal of water and ammonia during thermal decomposition of the ammonium zeolite at 500° to 600° C. and as high as 950° C. yields a hydrothermally stable product. (Slow removal can be effected, for example, by having the ammonium zeolite tightly packed in a test tube during calcination.) After water loading and thermal treatment the zeolite remains highly crystalline. A variety of techniques (X-ray diffraction, X-ray fluorescence analysis, ammonia adsorption, and cation exchange) indicate that about 20 percent of the aluminum, originally occupying tetrahedral sites in the crystal framework, is now in octahedrally coordinated cation sites in the hydrothermally stable zeolite. Thus, this material appears to be a hydrogen aluminum zeolite having aluminum site vacancies in the (Si, Al)O₂ framework. Hydrothermally unstable hydrogen zeolite Y (Equation 1) can be converted to the hydrothermally stable form by heating with ammonia at 500° to 950° C. Again, the product of this reaction appears to be a hydrogen aluminum zeolite in which the octahedral aluminum is derived from tetrahedral lattice aluminum.

The following reaction sequence is offered as a possible mechanism for the formation of the hydrothermally stable material, but it is not to be deemed as limitative in nature.

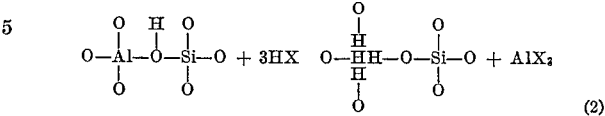

(2)

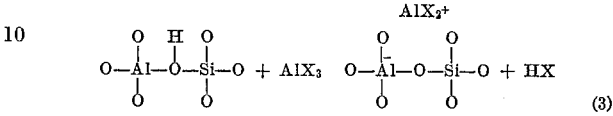

(3)

wherein X represents (NH₂)⁻.

Reaction (2) involves attack by a nucleophile on the "trigonal" aluminum which can act as a Lewis acid. This reaction occurs sufficiently slowly to permit surviving hydrogens to partake in reaction (3). By decreasing the number of "trigonal" aluminums in the zeolite, reaction (3) limits the degree to which reaction (2) can occur. This cation $AlX_2^+$, formed in reaction (3) is capable of further reaction with hydrogen zeolite to yield $AlX^{++}$ or $Al^{+++}$ ions. If reaction (2) occurs at much greater rate than reaction (3), the massive removal of aluminum from tetrahedral sites results in crystal lattice collapse. Where, as in the instant invention, HX is ammonia, reactions (2) and (3) proceed at approximately the same rate at 500° C. to 600° C.

The structures above are further confirmed by simple titration with aqueous sodium hydroxide. The hydrothermally unstable zeolite contains a substantially higher titratable-acid concentration; the hydrothermally stable zeolite contains a substantially higher concentration of base-exchangeable aluminum.

While it may occur to those familiar with the art that perhaps other atmospheres such as, for example, hydrogen sulfide and carbon dioxide might follow ammonia's course in the reaction sequence, this has not been found to be the case. Indeed, experiments with the above mentioned gases have failed to produce the catalysts of the invention.

Catalysts produced in accordance with the present invention are extremely catalytically active and are generally useful in hydrocarbon conversion reactions in which typical acid catalysts are presently employed. For example, the subject catalysts have extremely high cracking activity and may be used to convert materials such as gas oils, full crudes, paraffins, olefins and the like from high to low molecular weight materials. They may also be used in alkylation, dealkylation, isomerization, disproportionation, transalkylation and many other reactions. Typical reactions in which they may be used are, for example, disproportionation reactions involving the conversion of toluene to benzene and xylene or the conversion of methylnaphthalene to naphthalene and dimethylnaphthalene. A typical transalkylation reaction involves the reaction of benzene and methylnaphthalene to form toluene and naphthalene.

The invention will be described further in conjunction with the following specific examples, but it is to be understood that these are merely for purposes of illustration and are not intended to limit the invention thereto.

Examples 1 and 2, below, compared the effect of different calcination periods according to the procedure of the invention.

EXAMPLE 1

Several grams of ammonium zeolite Y were spread in a Petri dish and placed into a furnace at 600° C. The furnace was previously flooded with ammonia and ammonia was continuously passed through the furnace. After 1 hour, the zeolite was removed from the furnace and cooled in a desiccator. After two hydrothermal treatments (wetting the zeolite at room temperature followed by calcination at 600° C.) the zeolite was still highly crystalline as shown by cyclohexane sorption (19%) and X-ray diffraction powder photograph. Upon treatment of the initial calcined zeolite with excess 0.1 N sodium hydroxide solution, a product was obtained with the following composition. The composition of the initial ammonium zeolite also is presented for comparison:

| Atom ratio | Initial | Product |
|---|---|---|
| Na/Al | 0.057 | 0.929 |
| Si/Al | 2.85 | 3.05 |

These analyses indicate that little aluminum was removed from the zeolite (about 6%) and that over 90% of the remaining aluminum was in tetrahedral coordination.

EXAMPLE 2

Another sample of the ammonium zeolite Y of Example 1 was calcined in an ammonia-loaded furnace at 600° C. according to the procedure of Example 1, with the exception that the sample was removed from the furnace after 24 hours. The calcined product was hydrothermally stable and had the following composition after treatment with sodium hydroxide.

Atom ratio:
  Na/Al ------------------------------ 1.06
  Si/Al ------------------------------ 4.37

This composition, in comparison to the initial zeolite indicates that 35% of the aluminum was removed from the zeolite and that all of the remaining aluminum was tetrahedrally coordinated.

The following example demonstrated the beneficial effect of ammonia-gas treating on catalyst activity and selectivity, and on subsequent steam stability.

EXAMPLE 3

Ammonium Y aluminosilicate was charged to a container having a bottom inlet for the introduction of treating atmospheres and placed in a furnace at room temperature. The furnace temperature was raised 2° F. per minute until the 1500° F. treating temperature was attained. The temperature was held at 1500° F. for ten hours. During the heat up and during the calcination at 1500° F., ammonia gas was introduced into the bottom of the bed and allowed to flow up through the catalyst. This catalyst was then subjected to a steam treatment at 1200° F. for 24 hours with steam at 15 p.s.i.g. Following the thermal treatment at 1500° F. in the presence of ammonia, the crystallinity of the resulting product appeared to be excellent as evidenced by the product's cyclohexane adsorption capacity of 14.4 wt. percent and by X-ray showing 35% crystallinity and 180% shift. After the steam treatment at 1200° F. at 15 p.s.i.g. for 24 hours, the crystallinity was essentially unchanged showing 35% crystallinity and 200% shift [1] thereby substantiating the stabilizing effect of ammonia treating on subsequent steam stability. Comparative data appear below:

| | Calcined [1] | Calcined and steamed [2] |
|---|---|---|
| Conditions, LHSV | 16 | 16 |
| C/O | 0.38 | 0.38 |
| Conversion, vol. percent | 71.7 | 52.6 |
| C$_5$+Gasoline, vol. percent | 56.6 | 47.4 |
| Total C$_4$'s, vol. percent | 17.1 | 9.4 |
| Dry gas, wt. percent | 7.5 | 4.2 |
| Coke, wt. percent | 2.9 | 0.8 |
| H$_2$, wt. percent | 0.02 | 0.01 |
| Delta advantage over SiO$_2$/Al$_2$O$_3$ [3]: | | |
| C$_5$+Gasoline, vol. percent | +8.7 | +9.0 |
| Total C$_4$'s, vol. percent | −3.3 | −4.2 |
| Dry gas, wt. percent | −2.0 | −2.6 |
| Coke, wt. percent | −3.7 | −2.8 |

[1] Calcined in presence of NH$_3$.
[2] Same catalyst as 1 steamed at 1,200° F. with 15 p,s.i.g. steam for 24 hours.
[3] Delta advantage derived by comparing experimental catalyst with a standard silica-alumina gel catalyst (10% Al$_2$O$_3$) at the same conversion.

[1] The term "shift" as used in the examples is defined as a measure of the lattice contraction observed as the silica to alumina ratio increases, in going from type X to type Y zeolites. By definition, NaX with a SiO$_2$/Al$_2$O$_3$=2.44 has a shift=0 and NaY with a SiO$_2$/Al$_2$O$_3$=5.28 has a shift=100. By calibration of the lattice parameter decrease, the approximate silica to alumina ratio of a faujasite type material can be determined.

It will be seen by the above that the resulting crystalline product processed exceptional catalytic properties when evaluated at conditions of 900° F. at 16 LHSV, catalyst/oil ratio of 0.38 and cracking Mid-Continent wide range gas oil.

The following example demonstrated the effect of steaming a calcined acid Y aluminosilicate catalyst in an ammonia atmosphere.

EXAMPLE 4

Previously air-calcined ammonium Y aluminosilicate was subjected to a steam atmosphere containing 5 vol. percent ammonia at 1200° F. and 15 p.s.i.g. for 24 hours. The ammonia atmosphere was generated by pumping ammonium hydroxide into the preheater zone. Following steam treatment in the presence of ammonia, the catalyst was evaluated under conditions described in Example 3. The catalyst was subsequently retreated with steam in the same manner except that no ammonia was present during the steaming. It was then reevaluated for cracking. Comparative data appear below.

| | Steam treating in the presence of ammonia | Second steam treatment, no ammonia |
|---|---|---|
| Treatment to base calcination in air: | | |
| Time, hrs | 10 | 10 |
| Temperature, ° F | 1,600 | 1,600 |
| Steaming: | | |
| Type | ([1]) | ([1]) |
| Atmosphere | ([2]) | Steam |
| Catalyst properties: | | |
| App. dens., g./cc | 0.50 | |
| Surface area, m.$^2$/g | 450 | 409 |
| X-ray anal., shift, percent | 200 | |
| Crystallinity, percent | 45 | |
| LHSV, hr.−1 | 16 | 16 |
| C/O, vol./vol | 0.38 | 0.38 |
| Conversion, vol. percent | 53.9 | 53.3 |
| 10 RVP gasoline, vol. percent | 50.8 | 49.3 |
| Excess C$_4$'s, vol. percent | 7.3 | 7.7 |
| C$_5$+, gasoline, vol. percent | 48.1 | 46.7 |
| Total C$_4$'s, vol. percent | 10.1 | 10.4 |
| Dry Gas, wt. percent | 4.2 | 4.4 |
| Coke, wt. percent | 0.8 | 0.7 |

[1] 24 hrs./1,200° F/15 p.s.i.g.
[2] Steam+5% NH$_3$.

As will be noted, when steamed in the presence of 5 volume percent ammonia the calcined aluminosilicate catalyst became very selective and stable to the second steaming operation. This suggests another practical application of this invention, that is, injecting ammonia into those areas of commercial cracking units which contain steam since these are the places where rapid steam deactivation occurs during commercial operation.

What is claimed is:

1. A process for producing a hydrothermally stable catalyst composition which comprises calcining an ammonium crystalline aluminosilicate, characterized by a silica to alumina mol ratio of at least 3, in an atmosphere consisting essentially of ammonia.

2. The catalyst composition produced according to the process of claim 1.

3. A process aoccrding to claim 1 wherein said calcining is carried out at a temperature of at least about 500° C. for a period between about 1 and about 24 hours.

4. The catalyst composition produced according to the process of claim 3.

5. A process for converting hydrocarbons which comprises contacting a hydrocarbon charge under conversion conditions with the catalyst of claim 2.

6. A process according to claim 1 wherein said aluminosilicate is an ammonium Y crystalline aluminosilicate.

7. The catalyst composition produced according to the process of claim 6.

8. A process for cracking hydrocarbons which comprises contacting a hydrocarbon charge under catalytic cracking conditions with the catalyst of claim 7.

9. A process for enhancing the steam stability of a hydrogen crystalline aluminosilicate cracking catalyst, characterized by a silica to alumina mol ratio of at least 3, during a hydrocarbon cracking process employing steam in the operation thereof, which comprises mixing ammonia with the steam atmosphere.

10. A process according to claim 9 wherein said crystalline aluminosilicate is a hydrogen Y crystalline aluminosilicate.

References Cited

UNITED STATES PATENTS 3,239,471  3/1966  Ch'in et al. _____ 252—455

DELBERT E. GANTZ, *Primary Examiner.*

A. RIMENS, *Assistant Examiner.*